(12) United States Patent
Ropponen

(10) Patent No.: US 6,490,704 B1
(45) Date of Patent: Dec. 3, 2002

(54) METHOD FOR CORRECTING SYNCHRONIZATION ERROR AND RADIO SYSTEM

(75) Inventor: Antti Ropponen, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/434,880

(22) Filed: Nov. 5, 1999

Related U.S. Application Data

(63) Continuation of application No. PCT/FI98/00389, filed on May 6, 1998.

(30) Foreign Application Priority Data

May 7, 1997 (FI) .................................................. 971959

(51) Int. Cl.⁷ .......................... H03M 13/00; H04B 7/19; H04L 7/00
(52) U.S. Cl. ........................ 714/775; 370/324; 370/350; 375/357; 375/360; 455/13.2; 455/466; 704/212
(58) Field of Search ................................ 714/775, 747; 455/13.2, 436, 466; 370/324, 350, 465, 535; 704/226, 212, 214, 219; 375/358, 357, 360

(56) References Cited

U.S. PATENT DOCUMENTS

| | | | |
|---|---|---|---|
| 5,475,686 A | 12/1995 | Bach et al. .................. | 370/465 |
| 5,612,992 A | 3/1997 | Dupuy et al. ................ | 455/466 |
| 5,790,939 A * | 8/1998 | Malcom et al. ............. | 455/13.2 |
| 5,991,716 A * | 11/1999 | Lehtimaki .................... | 704/212 |
| 6,208,961 B1 * | 3/2000 | Lehtimaki et al. .......... | 704/226 |

FOREIGN PATENT DOCUMENTS

| | | |
|---|---|---|
| DE | 19647630 | 5/1998 |
| WO | 9501072 | 1/1995 |
| WO | 9821840 | 5/1998 |

* cited by examiner

*Primary Examiner*—Emmanuel L. Moise
(74) *Attorney, Agent, or Firm*—Altera Law Group, LLC

(57) ABSTRACT

The invention relates to a digital radio system and to a method for correcting a synchronization error in a digital radio system comprising at least one base station (100) communicating with terminals (102, 104) in its coverage area, and a mobile telephone exchange (108) communicating with the base station and controlling the operation of the base stations. The information to be transmitted is coded and decoded in a transcoder unit (200) into a form suitable for the transmission. The base station sends information frames to the transcoder at a certain pace, and, correspondingly, the transcoder sends information frames to the base station at a certain pace. To ensure easy transmission of information and to increase flexibility, the base station (100) indicates in an information frame sent to the transcoder (200) the synchronization error present in the information frames coming from the transcoder, and the transcoder corrects its synchronization after receiving said message.

5 Claims, 2 Drawing Sheets

|   | 1 | 2 | 3 | 4 | 5 | 6 | 7 | 8 |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 0 |
| 2 | 1 | C1 | C2 | C3 | C4 | C5 | C6 | C7 |
| 3 | C8 | C9 | C10 | C11 | C12 | C13 | S1 | S2 |
| 4 | D1 | D2 | ... | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |
| 12 | | | | | | | | |
| 13 | | | | | | | | |
| 14 | | | | | | | | |
| 15 | | | | | | | | |
| 16 | | | | | | | | |
| 17 | | | | | | | | |
| 18 | | | | | | | | |
| 19 | | | | | | | | |
| 20 | | | | | | | | |
| 21 | | | | | | | | |
| 22 | | | | | | | | |
| 23 | | | | | | | | |
| 24 | | | | | | | | |
| 25 | | | | | | | | |
| 26 | | | | | | | | |
| 27 | | | | | | | | |
| 28 | | | | | | | | |
| 29 | | | | | | | | |
| 30 | | | | | | | | |
| 31 | | | | | | | | |
| 32 | | | | | | | | |
| 33 | | | | | | | | |
| 34 | | | | | | | | |
| 35 | | | | | | | | |
| 36 | | | | | | | | |
| 37 | | | | | | | | |
| 38 | | | | | | | | |
| 39 | | | | | | ... | D287 | D288 |

Fig. 3

METHOD FOR CORRECTING SYNCHRONIZATION ERROR AND RADIO SYSTEM

This application is a continuation of PCT/FI98/00389 filed May 6, 1998.

FIELD OF THE INVENTION

The invention relates to a method for correcting a synchronization error in a digital radio system comprising at least one base-station communicating with terminals in its coverage area, and a mobile telephone exchange communicating with the base station and controlling the operation of the base stations, and that information to be transmitted is coded and decoded in a transcoder unit into a form suitable for the transmission, and that the base station sends information frames to the transcoder at a certain pace, and that the transcoder sends information frames to the base station at a certain pace.

BACKGROUND OF THE INVENTION

A typical cellular radio system comprises a fixed base station network comprising one or several base stations with which a subscriber terminal communicates. In addition, the cellular radio system comprises, for example, a base station controller controlling the base stations, and a mobile telephone exchange.

The requirements set on data transmission systems continue to increase. This applies particularly to wireless digital data transmission systems, such as cellular radio systems from which an increasingly wider range of services, such as different data services, are required.

Transmission of information on a channel having a restricted band-width is always a kind of compromise between the quality of transmission and the data transmission rate observed by a user. In order to optimize transmission of information, the information to be transmitted is coded in different manners in different phases on a transmission path.

In the fixed network, higher transmission rates are usually employed than in radio systems. For that reason, transmission rate adaptation is required between the fixed network and a radio system. A transcoder unit is employed in the transmission rate adaptation. The transcoder unit, i.e. TRAU (Transcoder/Rate Adaptor Unit) codes for example a signal of 64 kbit/s coming from the direction of the fixed network into a signal with a lower transmission rate and suitable for a radio network. Adapting the transmission rate of the signal enables optimization of transmission line traffic capacity. The TRAU functions as a source coder and reduces the bandwidth between the base station and the subscriber terminal. Naturally, a corresponding reverse coding is also performed in the other transmission direction.

The TRAU is placed for example in connection with a base station controller or a mobile telephone exchange. The TRAU and the base station communicate by sending and receiving TRAU frames. The frames include for example coded speech, control information signalling, or other data.

The present invention can be applied particularly to the GSM radio system when the data transmitted by the frames between the transcoder and the base station has a transmission rate of 7.2 or 14.4 kbit/s.

The base station and the transcoder send frames to each other. This transmission occurs synchronically, i.e. the apparatuses must be in synchronization. In a prior art system, the base station functions as a controller with respect to synchronization. The base station sends frames to the transcoder in the uplink transmission direction. The transcoder synchronizes with a signal of the base station and sends frames to the base station in the downlink transmission direction in synchronization with the uplink direction. If a disturbance occurs in the transcoder, and the synchronization of the frames sent to the base station is disturbed, the base station sends to the transcoder special synchronization frames by means of which the transcoder is resynchronized.

A problem in the above described arrangement is that the actual information frames are replaced with the synchronization frames, i.e. transmission of information is broken for a period of several frames. Since the base station functions as the controller of synchronization, only the base station can start resynchronization by sending synchronization frames.

BRIEF DESCRIPTION OF THE INVENTION

An object of the invention is to provide a method and an system so as to solve the above mentioned problems. This is achieved by the method of the type presented in the introduction, characterized in that the base station indicates in an information frame sent to the transcoder a synchronization error present in the information frames coming from the transcoder, and that the transcoder corrects its synchronization after receiving said message.

The invention also relates to a digital radio system comprising at least one base station communicating with terminals in its coverage area, and a mobile telephone exchange communicating with with the base station and arranged to control the operation of the base stations, and a transcoder unit arranged to code and decode information to be transmitted into a form suitable for the transmission, and that the base station is arranged to send information frames to the transcoder at a certain pace, and that the transcoder is arranged to send information frames to the base station at a certain pace. The system of the invention is characterized in that the base station is arranged to indicate in an information frame sent to the transcoder the synchronization error present in the information frames coming from the transcoder, and that the transcoder is arranged to correct its synchronization after receiving said message.

The solution of the invention provides many advantages. Both units (both the base station and the transcoder) can now correct synchronization errors. Frames are no longer lost in the uplink transmission direction because synchronization frames need not be sent.

BRIEF DESCRIPTION OF THE DRAWINGS

In the following, the invention will be described in more detail by means of preferred embodiments with reference to the accompanying drawings, in which

FIG. 3 illustrates a transcoder frame.

DETAILED DESCRIPTION OF THE INVENTION

Figure 1:
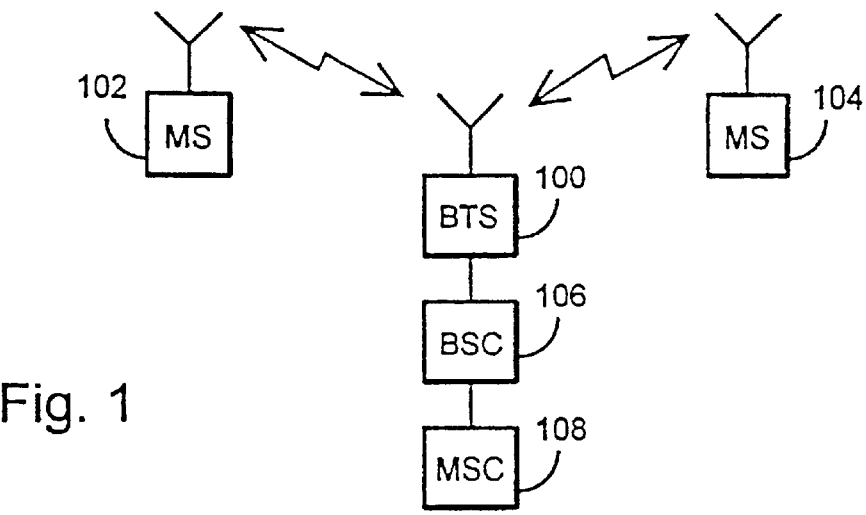
FIG. 1 shows a system whereto the invention can be applied.

Let us first study FIG. 1 illustrating a radio system wherein the method of the invention can be used. The radio system comprises at least one base station 100 communicating with subscriber terminals 102 to 104 within its area.

A base station controller 106, in turn, controls the operation of one or more base stations. In radio systems, a users speech and data traffic is transmitted between a base station and a subscriber terminal by using traffic channels. The base station controller 106 transmits traffic to a mobile telephone exchange 108 through which the traffic is forwarded to a fixed network or to other parts of the radio system.

Figure 2:
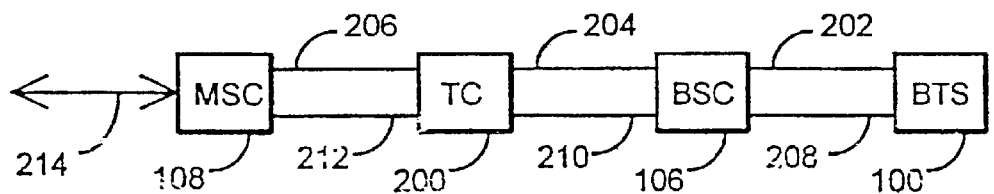
FIG. 2 illustrates in more detail a fixed part of the system of the invention.

The present invention is suitable for use particularly in the GSM radio system when the data transmitted by the frames between a transcoder and a base station has a transmission rate of 7.2 or 14.4 kbit/s. FIG. 2 illustrates in more detail an example of a fixed part of the system according to the invention. A fixed part refers in this context to the part between the base station and the mobile telephone exchange in the cellular radio system. The base station 100 transmits the signal coming from the terminal to the base station controller 106 via a line 202. The base station controller 106 transmits the signal to a transcoder 200 via a line 204. The transcoder 200 forwards the signal to the mobile telephone exchange 108 via a line 206. The mobile telephone exchange forwards a signal 214. This transmission chain 202–206 is called the uplink transmission direction. The transmission chain 208–212 in a reverse direction is called the downlink transmission direction.

The transcoder 200 adapts the transmission rate of the signal. The physical location of the transcoder can differ from the one presented in FIG. 2. The transcoder can be in connection with, for example a base station controller or a mobile telephone exchange. The location of the coder is irrelevant to the invention. In other words, the information between the transcoder and the base station is transmitted in frame format by using TRAU frames. The frame is in principle similar in both transmission directions. FIG. 3 illustrates a transcoder frame used with a transmission rate of 14.4 kbit/s. The frame then comprises 40 octets marked on a vertical axis, each octet thus comprising eight data bits marked horizontally.

Let us first study the operation of a prior art system. In other words, the base station 100 sends frames in the uplink transmission direction, and the transcoder 200 synchronizes with the transmission of the base station. The transcoder sends frames in the downlink transmission direction in the pace determined by the uplink transmission direction. If the transcoder for some reason loses the synchronization from the uplink frames, it places an UFE (Uplink Frame Error) bit in the following downlink frame, the UFE indicating the loss of synchronization. In the downlink frame in FIG. 3, this bit is denoted by C6. Although the transcoder does not receive uplink frames, the downlink transmission of frames first continues almost synchronically. If no synchronization is found, transmission of the downlink frames slides in time, and after some time the connection is reset. In the case of 14.4 kbit/s data, the base station sends a special synchronization frame in the uplink transmission direction before resetting. If problems occur in the downlink transmission direction, the base station immediately sends the, special synchronization frame in a known manner in the uplink transmission direction, and transmission of information is thus prevented.

In the solution of the invention, in turn, when the base station 100 detects synchronization problems in the downlink transmission direction, the base station transmits a synchronization error message to the transcoder 200. This message can be preferably placed in the following uplink frame as an indication of loses of synchronization in what is known as a DFE (Downlink Frame Error) bit. In the uplink frame in FIG. 3, this bit is denoted by C6. In a prior art frame, the bit location C6 is not used. When transmitting the synchronization error message, the base station continues uninterrupted transmission of information received from the subscriber terminal.

The transcoder receives the synchronization error message from the base station and corrects its synchronization in accordance with the frames received from the base station.

In the system of the invention, the method of the invention can be preferably implemented for example by software as operation commands programmed for a general purpose processor or a signal processor.

Although the invention is described above with reference to the example according to the attached drawings, it is obvious that the invention is not restricted thereto but it can be modified in many ways within the scope of the inventive idea presented in the attached claims.

I claim:

1. A method for correcting a synchronization error in a digital radio system including at least one base station communicating with terminals in its coverage area, and a mobile telephone exchange communicating with the base station and controlling the operation of the base stations, the method comprising:

coding and decoding information to be transmitted into a transmittable form in a transcoder unit;

sending information frames to the transcoder from the base station at a certain pace;

sending information frames to the base station from the transcoder at a certain pace;

indicating via a message in an information frame sent to the transcoder from the base station that an error in synchronization is present in the information frames coming from the transcoder; and correcting the synchronization after receiving said message by the transcoder.

2. A method as claimed in claim 1, further comprising informing the transcoder of the synchronization error by using a predetermined bit location of the information frame sent to the transcoder by the base station.

3. A method as claimed in claim 1, further comprising correcting the synchronization of information frames sent by the transcoder to comply with the synchronization of the information frames sent by the base station.

4. A method as claimed in claim 1, further comprising transmitting information at a rate of 14.4 kbit/s.

5. A digital radio system comprising at least one base station communicating with terminals in its coverage area, and a mobile telephone exchange communicating with the base station and arranged to control the operation of the base stations, and a transcoder unit arranged to code and decode information to be transmitted into a form suitable for the transmission, and that the base station is arranged to send information frames to the transcoder at a certain pace and that the transcoder is arranged to send information frames to the base station at a certain pace, wherein the base station is arranged to indicate via a message in an information frame sent to the transcoder a synchronization error present in the information frames coming from the transcoder, and that the transcoder is arranged to correct its synchronization after receiving said message.

* * * * *